United States Patent [19]

Kawase

[11] Patent Number: 5,992,258
[45] Date of Patent: Nov. 30, 1999

[54] ROTATION/LINEAR MOTION CONVERTING MECHANISM

[75] Inventor: Kazuo Kawase, Saitama, Japan

[73] Assignees: Akebono Brake Industry Co., Ltd., Tokyo; Akebono Research and Development Centre Ltd., Hanyu, both of Japan

[21] Appl. No.: 08/980,945

[22] Filed: Dec. 1, 1997

[51] Int. Cl.[6] .................................................. F16H 25/22
[52] U.S. Cl. ........................................ 74/424.8 C; 74/459
[58] Field of Search ........................... 74/459, 424.8 C, 74/424.8 R, 89.15, 441

[56] References Cited

U.S. PATENT DOCUMENTS

| | | | |
|---|---|---|---|
| 2,683,379 | 7/1954 | Strandgren | 74/424.8 |
| 3,214,991 | 11/1965 | Perrin | 74/424.8 |
| 3,585,869 | 6/1971 | Lemor | 74/89.15 |
| 3,730,016 | 5/1973 | Miller | 74/424.8 B |
| 4,375,770 | 3/1983 | Druet | 74/424.8 A |
| 4,526,053 | 7/1985 | Carson | 74/424.8 C |
| 4,615,229 | 10/1986 | Granbom | 74/424.8 C |
| 4,648,285 | 3/1987 | Carson | 74/424.8 C |

FOREIGN PATENT DOCUMENTS 59-147151   8/1984   Japan .

*Primary Examiner*—Tamara L. Graysay
*Assistant Examiner*—Debra Belles
*Attorney, Agent, or Firm*—Morgan, Lewis & Bockius LLP

[57] ABSTRACT

A mechanism for converting rotational motion to linear motion having a roller thread mechanism interposed between a shaft having multiple male threads and a nut having multiple female threads. The female threads of the nut are opposite in direction to the male threads of the shaft. The rollers have different effective thread diameters which are provided by the shape of the threads on the shaft, rollers and nut. The mechanism is configured so that the axial travel distance of the shaft, per relative rotation of the nut and the shaft, can be shortened. The mechanism is also capable of a fast movement, which is realized by suppressing the rotation of the rollers. When the mechanism is used as an actuator of a brake device, an antilock control, a traction control, and the like, it can be easily implemented by controlling the rotation of the rotor.

10 Claims, 8 Drawing Sheets

$\theta_S > \theta_N$ $T_N < T_S$

ROTATION/LINEAR MOTION CONVERTING MECHANISM

BACKGROUND OF THE INVENTION

The invention relates to a rotation/linear motion converting mechanism which converts a rotation force to a linear motion, and more particularly to a roller-thread mechanism and to a rotation/linear motion converting mechanism in which the efficiency is high and the distance of linear motion per rotation can be reduced.

Conventionally, a roller-thread mechanism is disclosed in, for example, Japanese Patent Unexamined Publication (Kokai) No. Sho. 59-147151.

As shown in FIG. 1, the roller-thread mechanism is configured by a shaft 20, a nut 21, and rollers 22 and has a mechanism in which the rollers 22 held by a retainer 23 are interposed between the shaft 20 and the nut 22, and, when the shaft 20 is rotated, the nut 21 is linearly moved in the axial direction.

However, such a roller-thread mechanism has problems such as the following.

A) The mechanism is configured so that the nut and the shaft have the same number of threads (sometimes, called stripes) and are identical in direction and the lead of the threads is not smaller than the thread pitch. Therefore, the travel distance of the shaft per rotation of the nut cannot be made shorter than three thread pitches. Specifically, in the case of a roller-thread mechanism, when the rollers and the shaft have the same diameter, the nut has a diameter which is not smaller than the sum of double of the diameter of eath roller and the diameter of the shaft. Furthermore, the number of threads of the nut is an integer. In a usual roller-thread mechanism, therefore, the number of threads of a nut must be three or more. As a result, the travel distance of the shaft per rotation of the nut cannot be made shorter than three thread pitches.

B) In order to shorten the axial travel distance of the roller with respect to the nut, the number of threads of the nut must be greater than that of each roller. However, this configuration increases the lead of the nut. As a result, a rotation power source of a high torque or a reduction gear of a high ratio is required for obtaining a desired axial force. Therefore, such a configuration is disadvantageous to miniaturization of an apparatus.

C) In a roller-thread mechanism in which the nut is not multi-threaded type (that is, the number of threads (stripes) is single), generally, the roller conducts relative axial movement with respect to the nut, and hence a mechanism for retracting the axial position of the rollers for each revolution is required, thereby complicating the configuration.

SUMMARY OF THE INVENTION

It is an object of the invention to solve the above-discussed problem, and particularly to provide a rotation/linear motion converting mechanism having a roller-thread mechanism in which rollers are interposed between a shaft having multi-male threads and a nut having multi-female threads, the rollers having threads meshing with both the threads, and an axial travel distance of the shaft per relative rotation of the nut and the shaft can be shortened.

The above-mentioned object can be attained by a rotation/linear motion converting mechanism, according to the present invention, comprising: a roller-thread mechanism in which rollers are interposed between a shaft having multi-male threads and a nut having multi-female threads, the rollers having threads meshing with both the threads, wherein the female threads of the nut are opposite in direction to the male threads of the shaft, the threads of the rollers have a shape which is formed by connecting two lines or curved faces with each other and which has different effective thread diameters $d_{R1}$, and $dR_2$, and, when an effective thread diameter of the nut is $d_N$, an effective thread diameter of a root portion of the thread ridges of the roller is $d_{R1}$, an effective thread diameter of a crest portion of the thread ridges of the rollers is $d_{R2}$, an effective thread diameter of the shaft is $d_S$, a number of threads of the nut is $J_N$, a number of threads of the rollers is $J_R$, and a number of threads of the shaft is $J_S$, the numbers of threads and the effective thread diameters are set so as to satisfy following conditions:

$$d_S = (\alpha - \gamma - 1) d_{R1}$$

$$J_S = (\alpha - 2) \cdot J_R$$

$$J_N = \alpha J_R$$

where $\alpha = d_N/d_{R1}$ and $\gamma = d_{R2}/d_{R1}$. The effective thread diameter, as shown for example in FIG. 4, is a diameter on a threaded member measured at a point where the thread makes contact with the thread of another threaded member.

According to the invention, the axial travel distance of the shaft in response to one rotation of the nut (or the shaft) can be suppressed to a small degree. Therefore, a desired axial force can be sufficiently obtained even at a low torque and without using a reduction gear of a high ratio. As a result, the whole of an apparatus can be reduced in size and the efficiency can be enhanced. When the mechanism is used as an actuator of a braking device, it is possible to realize a brake control of high performance by a small device.

The above-mentioned object can also be attained by a rotation/linear motion converting mechanism, according to the present invention, comprising: a roller-thread mechanism in which rollers are interposed between a shaft having multi-male threads and a nut having multi-female threads, the rollers having threads meshing with both the threads, wherein the female threads of the nut are opposite in direction to the male threads of the shaft, and, when a number of threads of the nut is $J_N$, an effective thread diameter of the nut is $d_N$, a number of threads of the rollers is $J_R$, an effective thread diameter of the threads of the rollers is $d_R$, a number of threads of the shaft is $J_S$, and an effective thread diameter of the shaft is $d_S$, the numbers of threads and the effective thread diameters are set so as to satisfy following conditions:

$$d_R/J_R = d_N/J_N = d_S/(J_S - \beta)$$

where, when $d_N = \alpha d_R$, $\beta$ satisfies $J_S = (\alpha - 2) \cdot J_R + \beta$. $\beta$ is an integer constant (having units of "number of threads") that specifies the additional number of threads required to cause the appropriate amount of axial travel of the shaft, per rotation of the nut relative to the shaft.

According to the invention, the lead of the shaft due to one revolution of the nut can be reduced to three or less thread pitches.

In the above-mentioned roller-thread mechanism, it is preferable that $\alpha$ and $\beta$ satisfy a following relationship:

$$\alpha > 2/(2 - \beta).$$

With this rolling-thread mechanism, the lead of the shaft due to one revolution of the nut can be reduced to one or less thread pitches.

Namely, according to the above-mentioned invention, the travel distance of the shaft due to one rotation of the nut can be suppressed to a small degree. Therefore, a desired axial force can be sufficiently obtained even at a low torque and without using a reduction gear of a high ratio. As a result, the whole of an apparatus can be reduced in size and the efficiency can be enhanced. When the mechanism is used as an actuator of a braking device, it is possible to realize a brake control of high performance by a small device.

DETAILED DESCRIPTION OF THE PREFERRED EMBODIMENTS

Figure 1:
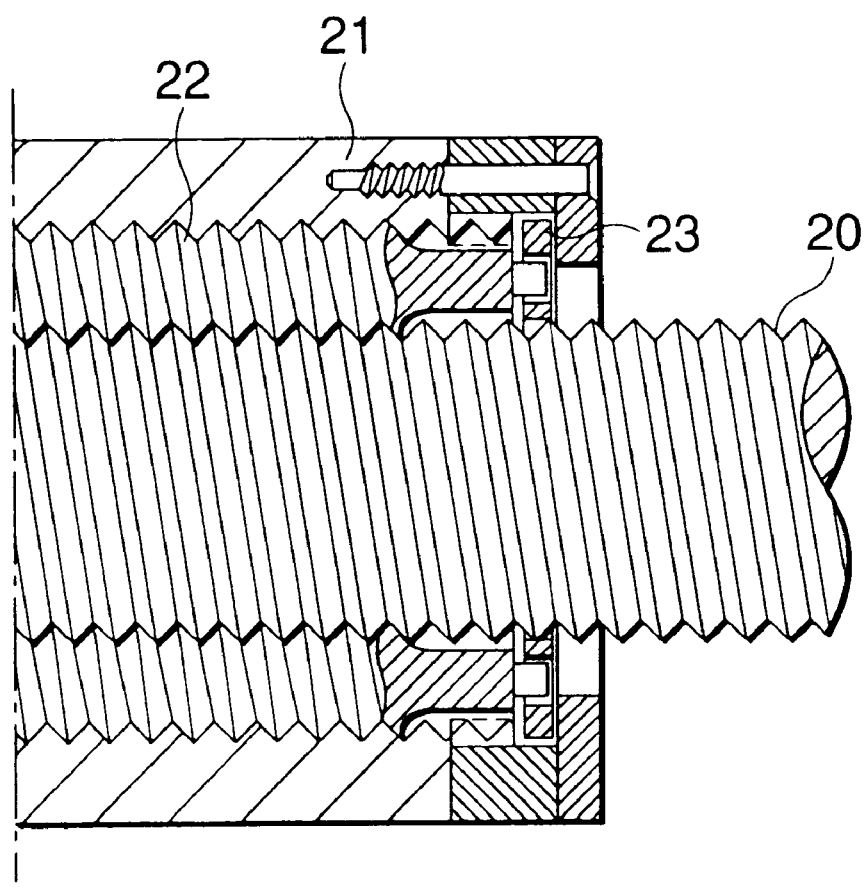
FIG. 1 is a section view of a roller-thread mechanism of the prior art.
Figure 2:
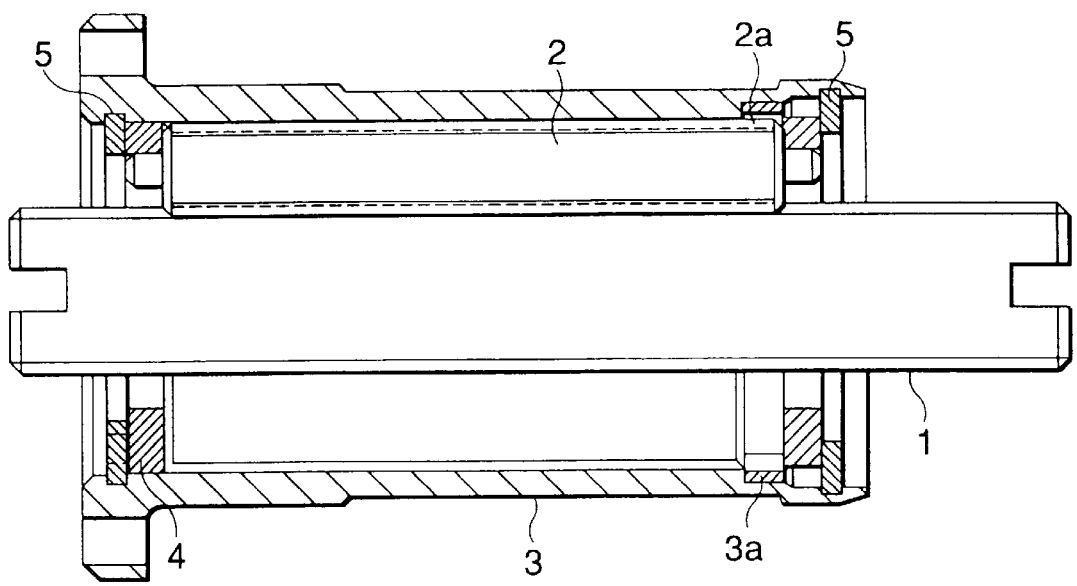
FIG. 2 is a section view of a rotation/linear motion converting mechanism according to a first embodiment of the invention.
Figure 3:
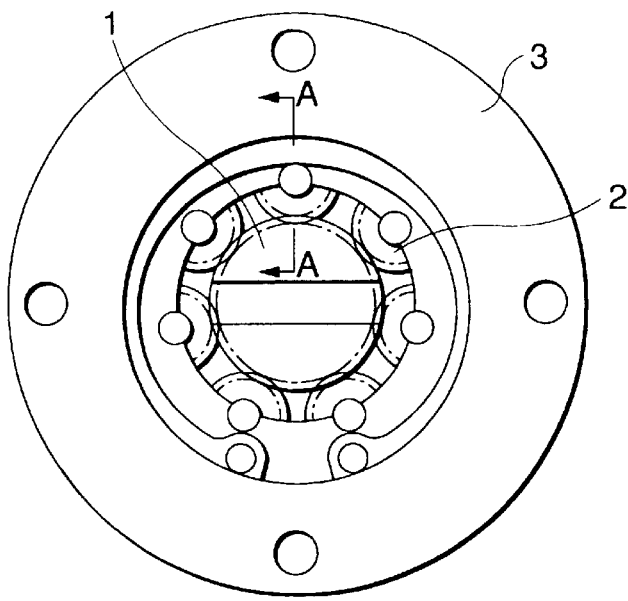
FIG. 3 is a side view of the rotation/linear motion converting mechanism according to the first embodiment of the invention.
Figure 4:
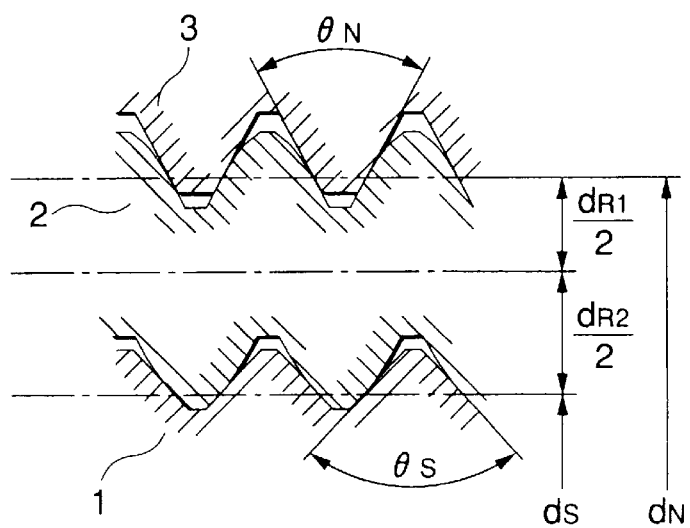
FIG. 4 is a section view taken along the line A—A of FIG. 3.
Figure 5:
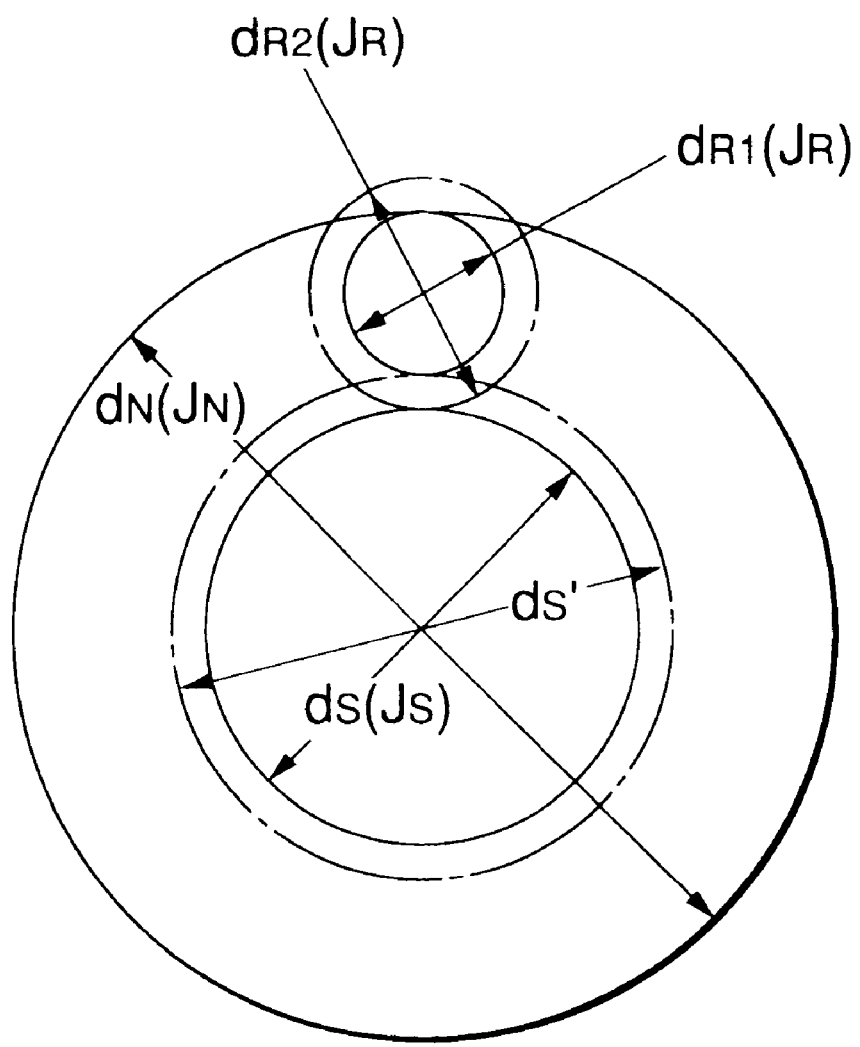
FIG. 5 is a diagram illustrating a meshing state of a nut, a roller, and a shaft in the first embodiment of the invention.

Hereinafter, a first embodiment of the invention will be described with reference to the accompanying drawings. FIG. 2 is a section view of a rotation/linear motion converting mechanism using a roller-thread mechanism which is the first embodiment, FIG. 3 is a side view of the mechanism, FIG. 4 is a section view taken along the line A—A of FIG. 3, and FIG. 5 is a diagram illustrating a meshing state of a nut, a roller, and a shaft.

In the figures, 1 designates a shaft, 2 designates rollers, and 3 designates a nut. These components configure a roller-thread mechanism.

For example, left-hand threads of the effective thread diameter $d_S$ and the number of threads $J_S$ are formed in the outer periphery of the shaft 1.

The rollers 2 are formed as roller screws which are screwed with the threads of the shaft 1. The ends of each roller are held by a retainer 4. Seven rollers are arranged around the shaft 1. The crest of each thread ridge on the rollers is formed in the following manner. As shown in FIG. 4, the radius $d_{R1}/2$ at a point where the threads of the rollers 2 are in contact with the female threads of the nut 3 (i.e., the effective thread radius of the root portion of the thread ridges of the rollers), and the radius $d_{R2}/2$ at a point where the threads of the rollers are in contact with the male threads of the shaft (i.e., the effective thread radius of the crest portion of the thread ridges of the rollers) are set to be $d_{R2} > d_{R1}$. In other words, the threads of the rollers have a shape which is formed by connecting two lines or curved faces with each other so that the angle $\theta_N$ of the female threads of the nut and the angle $\theta_S$ of the male threads of the shaft are set to be $\theta_S > \theta_N$.

The crest portion of each thread ridge of the rollers 2 is threadedly coupled to the threads of the shaft 1, and the root portion of the thread ridge to those of the nut 3. In each of the rollers 2, the number of the threads is $J_R$ and the threads are formed as right-hand threads which are opposite in direction to the threads of the shaft 1. A gear 2a is formed at one end of each roller 2 and inside the retainer 4. The gear 2a meshes with a gear 3a formed on the nut 3 which will be described later. The number of teeth of the gear 2a is set so as to attain a gear ratio which is equal to the ratio of the effective thread diameters of the roller 2 and the nut 3 (i.e., $d_{R1}/d_N$ where $d_N$ is the effective thread diameter of the threads of the nut). In FIG. 2, 5 designates a stop ring which holds the retainer 4. The number of the rollers disposed between the nut 3 and the shaft 1 is not larger than the sum of the numbers of threads of the nut and the shaft.

The nut 3 is disposed on the outer periphery of the roller screws. The female threads formed in the inner periphery of the nut are screwed with the roller screws. The female threads are formed as right-hand threads of the effective thread diameter $d_N$ and the number of threads $J_N$. The gear 3a which meshes with the gears 2a formed on the rollers 2 is formed on the nut 3. The number of teeth of the gear 3a formed on the nut 3 is set so as to attain a gear ratio which is equal to the ratio of the effective thread diameters of the roller screw and the nut.

In the embodiment, in order to shorten the axial travel distance of the shaft per rotation of the nut, when the effective thread diameter of the nut is $d_N$, the effective thread diameter of the root portion of the thread ridges of the rollers is $d_{R1}$, the effective thread diameter of the crest portion of the thread ridges of the rollers is $d_{R2}$, the effective thread diameter of the shaft is $d_S$, the number of threads of the nut is $J_N$, the number of threads of the rollers is $J_R$, and the number of threads of the shaft is $J_S$, the following conditions are satisfied:

$$d_{R1}/J_R = d_N/J_N = (d_N - 2d_{R1})/J_S$$

$$d_{R2} = \gamma \cdot d_{R1} \text{ (where } \gamma \text{ is a proportional constant)}$$

$$J_N = \alpha \cdot J_R (d_N = \alpha \cdot d_{R1})$$

where $\alpha$ is a proportional constant and an integer, and, because of the roller-thread mechanism configured by a combination of the nut, the rollers, and the shaft, when $\alpha \geq 3$, the following conditions are satisfied:

$$d_S = (\alpha - \gamma - 1) d_{R1}$$

$$J_S = (\alpha - 2) \cdot J_R$$

$$J_N = \alpha \cdot J_R.$$

In order to make the axial travel distance of the shaft per rotation of the nut shorter than one thread pitch, $\alpha$ and $\gamma$ are set so as to satisfy an expression of $\gamma < (\alpha \cdot J_R + 1)/(\alpha \cdot J_R - 1)$.

When $\gamma < 1$, the shaft moves in the opposite direction and $\alpha$ and $\gamma$ are set so as to satisfy $\gamma > (\alpha \cdot J_R - 1)/(\alpha \cdot J_R + 1)$.

The roller-thread mechanism which is defined as described above operates in the following manner.

When the nut 3 and the shaft 1 are relatively rotated, the rollers 2 rotate about their own axis and revolve around the shaft while the rollers make contact with the threads of the nut and the shaft and the teeth of the rollers mesh with those formed on the nut.

At this time, the rollers 2 are not relatively moved in the axial direction with respect to the nut 3 because the effective thread diameters and the numbers of threads of the rollers, the nut, and the shaft are in the following relationship $$d_{R1}/J_R = d_N/J_N = (d_N - 2d_{R1})/J_S$$

or, in other words, the ratio $J_R/J_N$ of the numbers of threads of the rollers 2 and the nut 3 is equal to the ratio $d_{R1}/d_N$ of the effective thread diameters of the rollers 2 and the nut 3. Since the rollers and the nut mesh with each other also by gears, rotational slippage between the rollers and the nut does not occur.

On the other hand, because the effective thread diameters and the numbers of threads of the shaft 1 and the nut 3 have the relationship of $d_N/J_N = (d_N - 2d_{R1})/J_S$, the shaft is relatively moved in the axial direction in response to one rotation of the nut. In the embodiment, however, the diameters and the numbers of threads are set so as to satisfy the following conditions:

$$d_S = (\alpha - \gamma - 1)d_{R1}$$

$$J_S = (\alpha - 2) \cdot J_R$$

$$J_N = \alpha \cdot J_R$$

when $d_{R2} = \gamma \cdot d_{R1}$ (where $\gamma$ is a proportional constant)

$$J_N = \alpha \cdot J_R (d_N = \alpha \cdot d_{R1}).$$

Therefore, the axial travel distance of the shaft per rotation of the nut can be shortened.

When $\alpha$ and $\gamma$ are set so as to satisfy an expression of $\gamma < (\alpha \cdot J_R + 1)/(\alpha \cdot J_R - 1)$, the axial travel distance of the shaft per rotation of the nut can be made shorter than one thread pitch, and a high torque is not required during the shaft movement.

Hereinafter, the reason of the above will be described in detail. As described above, the following relationships are established:

$$d_{R1}/J_R = d_N/J_N$$

$$d_N/J_N = (d_N - 2d_{R1})/J_S.$$

When, in the case where the shaft makes N rotations with respect to the nut, the number of relative rotations between the shaft and each roller is N1, the number of rotations of the roller is N2, and the number of relative rotations between the nut and the roller is N3, the following is held:

$$N1 + N3 = N.$$

From FIG. 5, $$d_N = d_S + d_{R1} + d_{R2}$$

and, from the relationships between the peripheral lengths of the components contacting with each other, the expressions below are held:

$$\pi \cdot d_{R2} \cdot N2 = \pi \cdot d_S \cdot N1$$

$$\pi \cdot d_{R1} \cdot N2 = \pi \cdot d_N \cdot N3.$$

Assuming that $$d_{R2} = \gamma \cdot d_{R1}$$

$$J_N = \alpha \cdot J_R,$$

the followings are held:

$$d_S = (\alpha - \gamma - 1)d_{R1}$$

$$J_S = (\alpha - 2) \cdot J_R$$

$$J_N = \alpha \cdot J_R.$$

Furthermore, $$N = N1 + N3 \tag{1}$$

$$N1 = N2 \cdot d_{R2}/d_S \tag{2}$$

$$N3 = N2 \cdot d_{R1}/d_N \tag{3}$$

From expressions (1), (2), and (3) above, $$N = N2(\alpha - 1)(\gamma + 1)/\alpha(\alpha - \gamma - 1).$$

When the thread pitch is indicated by P, therefore, the relative travel distance of the shaft per rotation of the nut (the difference between the travel distances of the contact points of the shaft and the nut) is expressed as follows:

$$L = (J_S \cdot P \cdot N1 - J_N \cdot P \cdot N3)/N = [(\alpha - 2) \cdot J_R \cdot P \cdot N2 \cdot \gamma/(\alpha - \gamma - 1) - \alpha \cdot J_R \cdot P \cdot N2/\alpha]/N$$
$$= J_R \cdot P \cdot \alpha(\gamma - 1)(\alpha - 1)/(\alpha - 1)(\gamma + 1) = J_R \cdot P \cdot \alpha(\gamma - 1)/(\gamma + 1).$$

From the above expression, in order to make L not larger than the pitch P, the following is to be satisfied $$J_R \cdot \alpha(\gamma - 1)/(\gamma + 1) < 1$$

and hence $\gamma$ is set as follows:

$$\gamma < (\alpha \cdot J_R + 1)/(\alpha \cdot J_R - 1).$$

In other words, the ratio $\gamma$ of the effective thread diameter $d_{R2}$ of the crest portion of each thread ridge of the rollers to the effective thread diameter $d_{R1}$ of the root portion of the thread ridge is required to satisfy the expression of $\gamma < (\alpha \cdot J_R + 1)/(\alpha \cdot J_R - 1)$.

When the number of threads of the rollers is 1, that of the nut is 4, $d_{R1}$ is 1, and $d_{R2}$ is 1.1, for example, $\alpha = 4$, $\gamma = 1.1$, and $J_R = 1$. Therefore, $$L = P \cdot J_R \cdot \alpha(\gamma - 1)/(\gamma + 1) = 0.19 \cdot P \cdot J_R.$$

According to the invention, when the diameters and the number of threads are set as described above, the axial travel distance of the shaft in response to one rotation of the nut can be suppressed to a small degree, and hence the travel distance of the shaft can be accurately controlled. When the mechanism is used as an actuator of a braking device, for example, it is possible to realize a brake control of high accuracy. A desired axial force can be sufficiently obtained even at a low torque and without using a reduction gear of a high ratio. Therefore, the whole of an apparatus can be reduced in size and the efficiency can be enhanced.

Next, a second embodiment will be described with reference to FIG. 6. The second embodiment is configured so that, in the embodiment described above, the radius $d_{R1}/2$ at a point where the threads of the rollers 102 are in contact with the female threads of the nut 103 (i.e., the effective thread radius of the root portion of the thread ridges of the rollers), and the radius $d_{R2}/2$ at a point where the threads of the rollers are in contact with the male threads of the shaft 101 (i.e., the effective thread radius of the crest portion of the thread ridges of the rollers) are set to be $d_{R2} > d_{R1}$.

Figure 6:
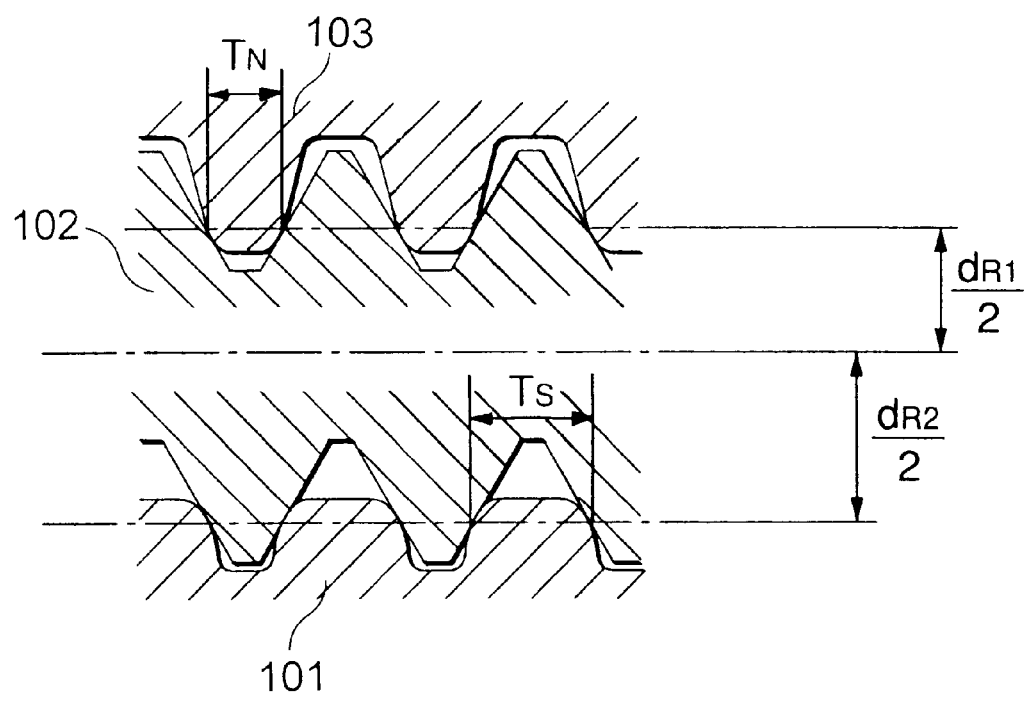
FIG. 6 is a section view of a rotation/linear motion converting mechanism according to a second embodiment of the invention.

In the embodiment, as shown in FIG. 6, each of the threads formed on the rollers is configured by a triangular thread having a substantially triangular section shape, each of the threads of the nut and the shaft which threadedly couple to the rollers is configured by a square thread having a substantially square section shape, and the tooth width $T_N$ (based on points of contact with the roller threads) of each of the square threads of the nut and the tooth width $T_S$ (based on points of contact with the roller threads) of each of the square threads of the shaft are set to be $T_N<T_S$. According to this configuration, the radius $d_{R1}/2$ at a point where the threads of the rollers 102 are in contact with the female threads of the nut 103, and the radius $d_{R2}/2$ at a point where the threads of the rollers are in contact with the male threads of the shaft are in the relationship of $d_{R2}>d_{R1}$, and, in the same manner as the embodiment described above, the axial travel distance of the shaft in response to one rotation of the nut can be suppressed to a small degree.

Naturally, the rotation/linear motion converting mechanism of the invention can be used as an actuator of a brake device known in the prior art. It is a matter of course that, when the mechanism is used as an actuator of a brake device, an antilock control, a traction control, and the like can be easily implemented by controlling the rotation of a rotor.

Figure 7:
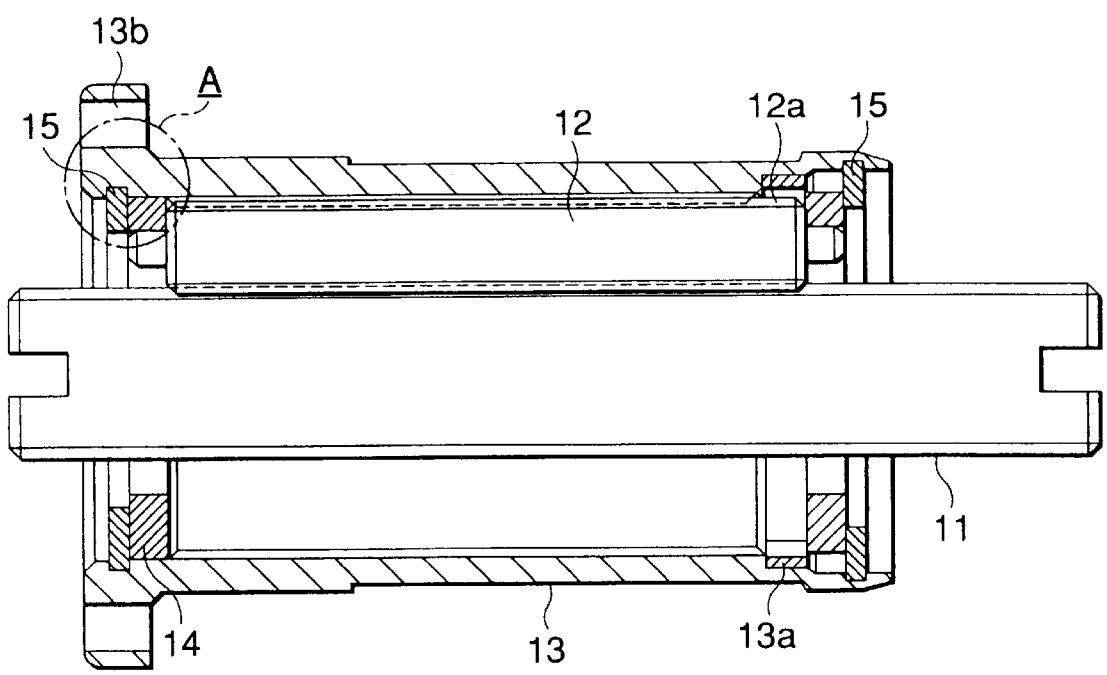
FIG. 7 is a section view of a rotation/linear motion converting mechanism according to a third embodiment of the invention.
Figure 8:
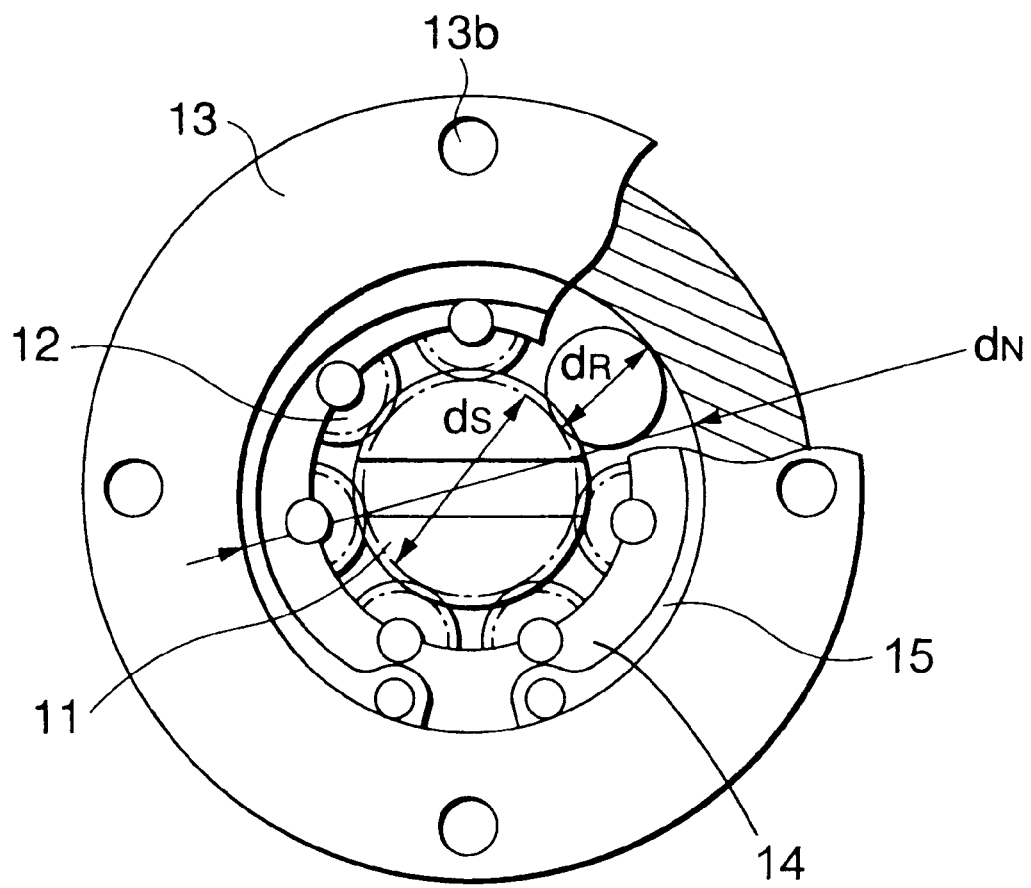
FIG. 8 is a side view of the rotation/linear motion converting mechanism according to the third embodiment of the invention.

Hereinafter, a third embodiment of the invention will be described with reference to the accompanying drawings. FIG. 7 is a section view of a rotation/linear motion converting mechanism using a roller-thread mechanism which is the third embodiment, and FIG. 8 is a side view of the mechanism.

In the figures, 11 designates a shaft, 12 designates rollers 13b dsignates a mounting hole, and 13 designates a nut. These components configure a roller-thread mechanism.

For example, left-hand threads of the effective thread diameter $d_S$ and the number of threads $J_S$ are formed in the outer periphery of the shaft 11.

The rollers 12 are formed as roller screws which are screwed with the threads of the shaft 11. The ends of each roller are held by a retainer 14. Seven rollers are arranged around the shaft 11. The threads of each of the rollers have an effective thread diameter $d_R$, the number of the threads is $J_R$, and the threads are formed as right-hand threads which are opposite in direction to the threads of the shaft. A gear 12a is formed at one end of each roller 12 and inside the retainer. The gear 12a meshes with a gear 13a formed on the nut 13 which will be described later. The number of teeth of the gear 12a is set so as to attain a gear ratio which is equal to the ratio of the effective thread diameters of the roller 12 and the nut 13 (i.e., $d_R/d_N$ where $d_N$ is the effective thread diameter of the threads of the nut). In FIG. 7, 15 designates a stop ring which holds the retainer 14. The number of the rollers disposed between the nut and the shaft is not larger than the sum of the numbers of threads of the nut and the shaft.

The nut 13 is disposed on the outer periphery of the roller screws. The female threads formed in the inner periphery of the nut are screwed with the roller screws. The female threads are formed as right-hand threads of the effective thread diameter $d_N$ and the number of threads $J_N$. The gear 13a which meshes with the gears 12a formed on the rollers is formed on the nut 13. The number of teeth of the gear formed on the nut is set so as to attain a gear ratio which is equal to the ratio of the effective thread diameters of the roller and the nut.

In the embodiment, in order to make the travel distance of the shaft per rotation of the nut shorter than three thread pitches, and furthermore shorter than one thread pitch, when the effective thread diameters and the numbers of threads of the shaft 11, the rollers 12, and the nut 13 are set as follows:

|  | Nut | Rollers | Shaft |
| --- | --- | --- | --- |
| Number of threads | $J_N$ | $J_R$ | $J_S$ |
| Effective diameter | $d_N$ | $d_R$ | $d_S$ | the diameters and the numbers of threads are set so as to satisfy the following conditional expressions.

Namely, in order to make the travel distance of the shaft per rotation of the nut shorter than three thread pitches, β which satisfies $$J_S=(\alpha-2)\cdot J_R+\beta$$

is obtained while setting $d_N=\alpha d_R$, and the conditions are set so as to satisfy $$d_R/J_R=d_N/J_N=d_S/(J_S-\beta).$$

In order to make the travel distance of the shaft per rotation of the nut shorter than one thread pitch, the above-mentioned mentioned conditions are to be satisfied, and furthermore α and β are set so as to satisfy $$\alpha>2/(2-\beta)$$

The roller-thread mechanism which is defined as described above operates in the following manner.

When the nut and the shaft are relatively rotated, the rollers rotate about its own axis and revolve around the shaft while the rollers make contact with the threads of the nut and the shaft and the teeth of the rollers mesh with those formed on the nut. At this time, the rollers 12 are not moved in the axial direction relative to the nut 13 because the effective thread diameters and the numbers of threads of the rollers and the nut are in the relationship of $J_R/J_N=d_R/d_N$. In a thread mechanism, generally, the meshing contact point of meshing threads may be shifted for each rotation and the effective thread diameters may be slightly changed. In the embodiment, as described above, the rollers 12 and the nut 13 mesh with each other also by means of the gears 12a and 13a. Even when the contact points of the rollers 12 and the nut 13 are shifted, therefore, the rollers 12 are caused by the gear of the nut 13 to correctly rotate about it own axis while revolving around the shaft. In this way, relative movement between the rollers and the nut never occurs.

On the other hand, because the effective thread diameters and the numbers of threads of the shaft 11 and the nut 13 have the relationship of $J_N/J_S \neq d_N/d_S$, the shaft 11 is relatively moved in the axial direction with respect to the nut 13. In the embodiment, however, β which satisfies $J_S=(\alpha-2)\cdot J_R+\beta$ is obtained while setting $d_N=\alpha d_R$, and the conditions are set so as to satisfy $$d_R/J_R=d_N/J_N=d_S/(J_S-\beta).$$

Therefore, the travel distance of the shaft per rotation of the nut can be made shorter than three thread pitches, and a high torque is not required during the shaft movement.

In addition to the above-mentioned conditions to be satisfied, furthermore, the relationship of α and β is set so as to satisfy the expression of $\alpha>2/(2-\beta)$. Therefore, the travel distance of the shaft per rotation of the nut can be made shorter than one thread pitch.

Hereinafter, the reason of the above will be described in detail.

When, in the case where the shaft makes N rotations with respect to the nut, the number of rotations of the shaft with respect to the rollers is N1, the number of rotations of the rollers is N2, and the number of rotations of the nut with respect to the rollers is N3, the following is held:

$$N1+N3=N.$$

Furthermore, the embodiment is configured so that, when $$d_N=\alpha d_R \text{ and}$$

$\beta$ satisfies $J_S=(\alpha-2)\cdot J_R+\beta$, $$d_R/J_R=d_N/J_N=d_S/(J_S-\beta)$$

is satisfied.

From the relationships between the peripheral lengths of the components contacting with each other, therefore, the expressions below are held:

$$\pi\cdot d_R\cdot N2=\pi\cdot d_S\cdot N1=\pi\cdot d_N\cdot N3$$

$$N1=N2\cdot d_R/d_S=N2/(\alpha-2)$$

$$N3=N2\cdot d_R/d_N=N2/\alpha$$

$$N2=N\cdot\alpha(\alpha-2)/(2\cdot\alpha-2).$$

When the thread pitch is indicated by P, therefore, the travel distance S of the relative movement of the hut and the shaft is obtained by $$S=P\cdot J_S\cdot N1-P\cdot J_N\cdot N3.$$

When the above expression is transformed, the following expression is obtained:

$$S=P\cdot N\cdot\alpha\cdot\beta(2\cdot\alpha-2).$$

From this expression, under the above-mentioned conditions, the travel distance S of the shaft per rotation of the nut relative to the shaft can be made shorter than three thread pitches.

When, in addition to the above-mentioned conditions to be satisfied, the relationship of $\alpha$ and $\beta$ is set so as to satisfy $\alpha>2/(2-\beta)$, the travel distance of the shaft per rotation of the nut can be made shorter than one thread pitch.

For example, the ratio of the effective thread diameters of the shaft and the nut is set to be 1:3, and the numbers of threads are set to be 2:3 (i.e., $\alpha=3$ and $\beta=1$). In this case, when one relative rotation of the shaft and the nut is conducted (that is, when the shaft makes ¾ rotation in the right direction, the nut makes ¼ rotation in the left direction and the sum of the rotations of the shaft and the nut results in one relative rotation), the relative travel distance of the shaft in the axial direction (an apparent lead) is as follows:

Apparent lead=(lead of the shaft)−(lead of the nut)
 =(thread pitch×2×¾)
  −(thread pitch×3×¼)
 =−thread pitch×¾ (in the direction of the threads of the shaft)

In this way, the travel distance of the shaft per rotation of the nut can be made shorter than three thread pitches, and the travel distance of the shaft can be accurately controlled.

For example, the ratio of the effective thread diameters of the shaft and the nut is set to be 1:2, and the numbers of threads are set to be 3:4 (i.e., $\alpha=4$ and $\beta=1$). In this case, when one relative rotation of the shaft and the nut is conducted (that is, when the shaft makes ⅔ rotation in the right direction, the nut makes ⅓ rotation in the left direction and the sum of the rotations of the shaft and the nut results in one relative rotation), the relative travel distance of the shaft in the axial direction (an apparent lead) is as follows:

Apparent lead=(lead of the nut)−(lead of the shaft)
 =(thread pitch×4×⅓)
  −(thread pitch×3×⅔)
 =−thread pitch×⅔ (in the direction of the threads of the shaft)

In this way, the travel distance of the shaft per rotation of the nut can be made shorter than one thread pitch, and the travel distance of the shaft can be accurately controlled.

In the roller-thread mechanism, when the axial load applied to the thread contact portions of the shaft 11 and the rollers 12 is small, the rotation of the rollers may be restricted so that the threads of the shaft slip, thereby enabling the fast movement to be realized by means of the real lead.

Figure 9:
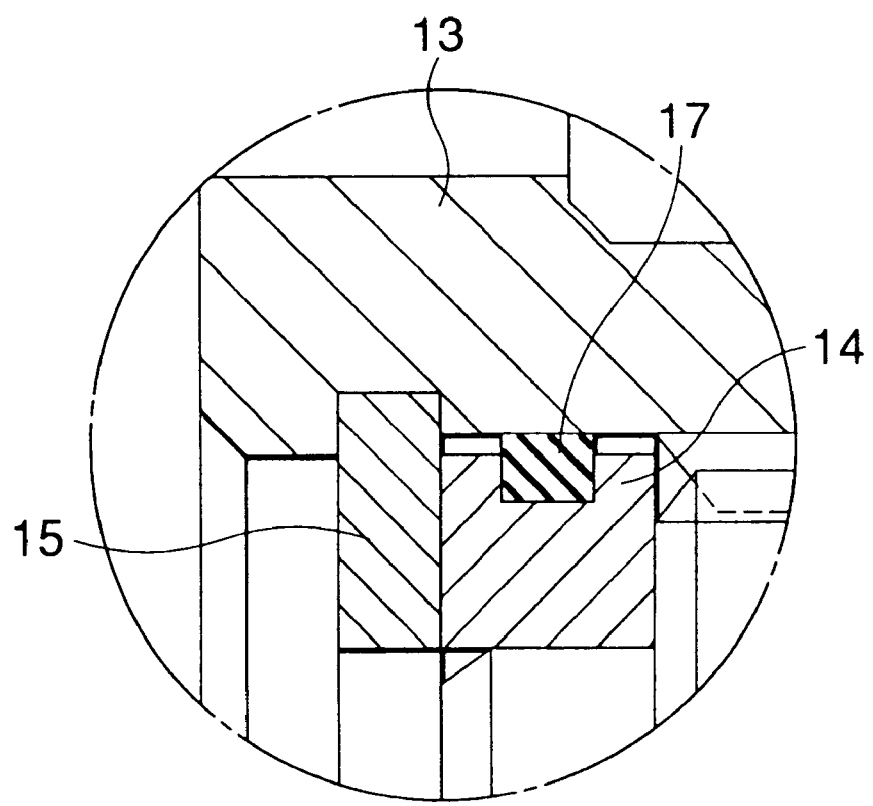
FIG. 9 is an enlarged view of a portion A in FIG. 7.

This example will be described with reference to FIG. 9. FIG. 9 is an enlarged view of a portion A in FIG. 7. In the figure, 17 designates a friction ring. The friction ring 17 is fitted onto the outer periphery of each of the retainers 14. Stop ring 15 holds the retainer 14. The outer periphery of each friction ring 17 is in frictional contact with the inner periphery of the nut 13. In this way, the friction rings 17 are interposed between the nut 13 and the retainer 14. Therefore, the rotations of these components are restricted by the friction force exerted by the friction rings 17. As a result, when the axial load applied to the thread contact portions is small, the threads of the shaft are caused to slip, so that the fast movement can be realized by means of the real lead. The friction rings 17 are made of rubber or another material which functions in a similar manner as rubber. The above-mentioned effects can be attained in both the cases where the friction rings 17 are disposed only on the retainer and where a single friction ring is disposed only on the nut.

As described above, according to the invention, the female threads of the nut are opposite in direction to the male threads of the shaft, the ratio of the numbers of threads of the rollers and the nut is equal to that of the effective thread diameters of the rollers and the nut, the ratio of the numbers of threads of the shaft and the nut is different from that of the effective thread diameters of the shaft and the nut, and the rollers mesh with the nut also by means of gears. Therefore, the rollers are not relatively moved with respect to the nut. When the nut makes one rotation, only the shaft performs a stroke which is smaller than the pitch. Consequently, the travel distance of the shaft per rotation of the nut can be suppressed to a small degree.

Naturally, the rotation/linear motion converting mechanism of the invention can be used as an actuator of a brake device known in the prior art. It is a matter of course that, when the mechanism is used as an actuator of a brake device, an antilock control, a traction control, and the like can be easily implemented by controlling the rotation of a rotor.

As described above in detail, according to the invention, the travel distance of the shaft in the axial direction in a roller-thread mechanism in response to one rotation of the nut can be suppressed to a small degree. Therefore, the travel distance of the shaft can be accurately controlled at a low torque. The invention can attain excellent effects such as that, when the mechanism is used as an actuator of a brake device, it is possible to realize a brake control of high accuracy.

As described above in detail, according to the invention, the travel distance of the shaft in a roller-thread mechanism in response to one rotation of the nut can be suppressed at least to at least three or less thread pitches, or further to one or less thread pitch. Therefore, the travel distance of the shaft can be accurately controlled. The invention can attain excellent effects such as that, when the mechanism is used as an actuator of a brake device, it is possible to realize a brake control of high accuracy.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rotation/linear motion converting mechanism comprising a roller-thread mechanism including a plurality of rollers, a shaft having multi-male threads, an d a nut having multi-female threads, said rollers having threads meshing with both the multi-male and multi-female threads, said multi-male threads, having a substantialy trian ular shape and thread angle $\Theta_S$, said multi-female threads having a substantially triangular shape and thread angle $\Theta_N$, and wherein the female threads of said nut are opposite in direction to the male threads of said shaft, the threads of said rollers having a shape formed by connecting two lines or curved faces with each other and including different effective thread diameters $d_{R1}$ and $d_{R2}$, and, wherein when $d_N$ is an effective thread diameter of said nut $d_{R1}$ is an effective thread diameter at a point where the threads of said roller are in contact with the female threads of said nut, $d_{R2}$ is an effective thread diameter at a point where the threads of said rollers are in contact with the male threads of said shaft, and wherein said thread diameter $d_{R1}$ is determined by $\Theta_N$, and said thread diameter $d_{R2}$ is determined $\Theta_S$, and $d_S$ is an effective thread diameter of said shaft, $J_N$ is a number of threads of said nut, $J_R$ is a number of threads of said rollers, and $J_S$ is a number of threads of said shaft, the number of threads and the effective thread diameters are set so as to satisfy the following conditions:

$$d_S = (\alpha - \gamma - 1) d_{R1}$$

$$J_S = (\alpha - 2) \cdot J_R$$

$$J_N = \alpha \cdot J_R$$

where $\alpha = d_N/d_{R1}$ and $\gamma = d_{R2}/d_{R1}$.

2. The rotation/linear motion converting mechanism according to claim 1, wherein the numbers of threads and the effective thread diameters are set so as to satisfy a condition that $\alpha$ and $\gamma$ satisfy a following expression:

$$\gamma < (\alpha \cdot J_R + 1)/(\alpha \cdot J_R - 1)$$

where $$d_{R1}/J_R = d_N/J_N = (d_N - 2d_{R1})/J_S$$

$$d_{R2} \gamma \cdot d_{R1} \text{(where } \gamma \text{ is a proportional constant)}$$

$$J_N = J_R (d_N = \alpha \cdot d_{R1}).$$

3. The rotation/linear motion converting mechanism according to claim 2, wherein the threads formed on said rollers are set so that a radius $d_{R1}/2$ at a point where the threads of said rollers are in contact with the female threads of said nut, and a radius $d_{R2}/2$ at a point where the threads of said rollers are in contact with the male threads of said shaft are set to be $d_{R2} > d_{R1}$.

4. The rotation/linear motion converting mechanism according to claim 1, wherein the threads formed on said rollers are set so that a radius $d_{R1}/2$ at a point where the threads of said.rollers are in contact with the female threads of said nut, and a radius $d_{R2}/2$ at a point where the threads of said rollers are in contact with the male threads of said shaft are set to be $d_{R2} > d_{R1}$.

5. A rotation/linear motion converting mechanism comprising a roller-thread mechanism having rollers, a shaft having multi-male threads, a nut having multi-female threads, and a retainer for retaining said rollers axially said rollers having threads meshing with both the multi-male and multi-female threads, and wherein said retainers and said nut abut against each other through a member having a coefficient of friction that prevents relative rotation of said rollers and said nut when an axial load on said rollers is less than a pre-selected value, and wherein the female threads of said nut are opposite in direction to the male threads of said shaft, and, when a number of threads of said nut is $J_N$, an effective thread diameter of said nut is $d_N$, a number of threads of said rollers is $J_R$, an effective thread diameter of the threads of said rollers is $d_R$, a number of threads of said shaft is $J_S$, and an effective thread diameter of said shaft is $d_S$, the number of threads and the effective thread diameters are set so as to satisfy the following conditions:

$$d_R/J_R = d_N/J_N = d_S/(J_S - \beta)$$

where, when $d_N = \alpha \cdot d_R$, $\beta$ satisfies $J_S = (\alpha - 2) \cdot J_R + \beta$.

6. The rotation/linear motion converting mechanism according to claim 5, wherein $\alpha$ and $\beta$ satisfy the following:

$$\alpha > 2/(2-\beta).$$

7. The rotation/linear motion converting mechanism according to claim 6, wherein said rollers mesh with said nut by a gear member having a gear ratio which is equal to a ratio of the effective thread diameters of the threads of said rollers and said nut.

8. The rotation/linear motion converting mechanism according to claim 5, wherein said rollers mesh with said nut by a gear member having a inverse gear ratio which is equal to a ratio of the effective thread diameters of the threads of said rollers and said nut.

9. A rotation/linear motion converting mechanism comprising:

a roller-thread mechanism having a plurality of rollers;

a shaft having multi-male threads; and a nut having multi-female threads, said rollers having threads meshing with both the multi-male and multi-female threads, said multi-male threads having a substantially rectangular shape and thread width $T_S$, said multi-female threads having a substantially rectangular shape and thread width $T_N$, and wherein the female threads of said nut are opposite in direction to the male threads of said shaft, the threads of said rollers having a shape formed by connecting two lines or curved faces with each other and having different effective thread diameters $d_{R1}$ and $d_{R2}$, and, when $d_N$ is an effective thread diameter of said nut, $d_{R1}$ is an effective thread diameter at a point where the thread ridges of said roller are in contact with the female threads of said nut, $d_{R2}$ is an effective thread diameter at a point where the thread ridges of said rollers are in contact with the male threads of said shaft, and wherein said thread diameter $d_{R1}$ is determined by $T_N$, and said thread diameter $d_{R2}$ is determined by $T_S$, and $d_S$ is an effective thread diameter of said shaft, $J_N$ is a number of threads of said nut, $J_R$ is a number of threads of said rollers, and $J_S$ is a number of threads of said shaft, the number of threads and the effective thread diameters are set so as to satisfy the following conditions:

$$d_S = (\alpha - \gamma - 1)d_{R1}$$

$$J_S = (\alpha - 2)J_R$$

$$J_N = \alpha \cdot J_R$$

where $\alpha = d_N/d_{R1}$ and $\gamma = d_{R2}/d_{R1}$.

10. A rotation/linear motion converting mechanism according to claim 9, wherein the numbers of threads and the effective thread diameters are set so as to satisfy a condition that a and $\gamma$ satisfy the following expression:

$$\gamma < (\alpha \cdot J_R + 1)/(\alpha \cdot J_R - 1)$$

where $$d_{R1}/J_R = d_N/J_N = (d_N - 2d_{R1})/J_S$$

$d_{R2} = \gamma \cdot d_{R1}$ (where $\gamma$ is a proportional constant)

$$J_N = \alpha \cdot J_R \quad (d_N = \alpha \cdot d_{R1}).$$

* * * * *